United States Patent [19]

Hosomizu et al.

[11] Patent Number: 4,839,686

[45] Date of Patent: Jun. 13, 1989

[54] FLASH DEVICE

[75] Inventors: Hiroshi Hosomizu; Tsutomu Ichikawa; Makoto Kamiya; Masatoshi Yoneyama; Kenji Tsuji, all of Osaka, Japan

[73] Assignee: Minolta Camera Kabushiki Kaisha, Osaka, Japan

[21] Appl. No.: 216,725

[22] Filed: Jul. 8, 1988

[30] Foreign Application Priority Data

Jul. 10, 1987 [JP] Japan ................. 62-173466

[51] Int. Cl.$^4$ .............................................. G03B 15/05
[52] U.S. Cl. .................................. 354/416; 354/145.1
[58] Field of Search ............... 354/413, 416, 417, 419, 354/145.1

[56] References Cited

U.S. PATENT DOCUMENTS

| 4,174,896 | 11/1979 | Mizokami et al. | 354/145.1 |
| 4,309,092 | 1/1982 | Kitagawa | 354/416 |
| 4,310,785 | 1/1982 | Iwata | 354/145.1 |
| 4,460,264 | 7/1984 | Winter | 354/419 |
| 4,697,906 | 10/1987 | Kobayashi et al. | 354/416 |
| 4,717,861 | 1/1988 | Yuasa et al. | 354/145.1 |

FOREIGN PATENT DOCUMENTS

| 57-38596 | 3/1982 | Japan . |
| 58-42600 | 9/1983 | Japan . |
| 61-50126 | 3/1986 | Japan . |
| 63-94729 | 4/1988 | Japan . |
| 63-95722 | 4/1988 | Japan . |
| 63-95723 | 4/1988 | Japan . |
| 63-95724 | 4/1988 | Japan . |
| 63-95725 | 4/1988 | Japan . |
| 63-95726 | 4/1988 | Japan . |
| 63-95727 | 4/1988 | Japan . |
| 63-95728 | 4/1988 | Japan . |
| 63-95730 | 4/1988 | Japan . |

OTHER PUBLICATIONS

"Mosfet", *Nikkei Electronics*, No. 395, pp. 165–188 (May 19, 1986).

K. Muramoto et al, "New Type of Bipolar-Mode MOS FET", *Toshiba Review*, vol. 40, No. 5, pp. 427–432 (May 1985).

Y. Sasada et al, "High-Voltage IGBT Module", *Toshiba Review*, vol. 41, No. 10, pp. 873–876 (Oct., 1986).

"Canon EOS 650 Test: Best Autofocus SLR Yet", *Modern Photography*, pp. 84, 92, 99 and 100 (Jul. 1987).

*Primary Examiner*—Russell E. Adams
*Attorney, Agent, or Firm*—Burns, Doane, Swecker & Mathis

[57] ABSTRACT

An improved flash device which is characterized in the provision of a power source, a main capacitor adapted to be charged by the power source, a flash firing unit operable to consume charge stored in the main capacitor to emit a flash light, a trigger circuit for exciting the flash firing unit in response to a flash firing command, an insulated gate bipolar transistor disposed in a discharge loop for the main capacitor through the flash firing unit, and a control circuit for applying a voltage to a gate of the insulated gate bipolar transistor in response to the flash firing command and for interrupting the application of the voltage to the insulated gate bipolar transistor in response to a flash terminating command.

12 Claims, 8 Drawing Sheets

Fig. 5(a) Normal Mode
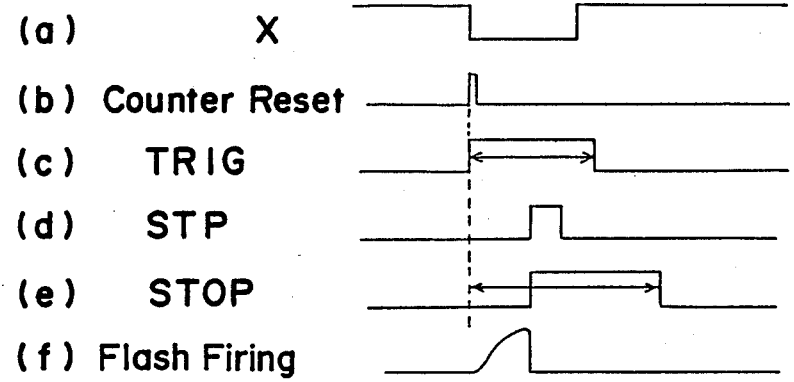
(a) X
(b) Counter Reset
(c) TRIG
(d) STP
(e) STOP
(f) Flash Firing
Fig. 5(b) High Speed Sync Mode
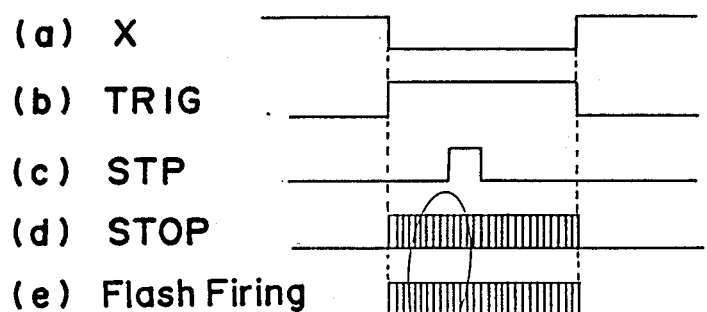
(a) X
(b) TRIG
(c) STP
(d) STOP
(e) Flash Firing
Enlarged
(d) STOP
(e)
Fig. 6(a)
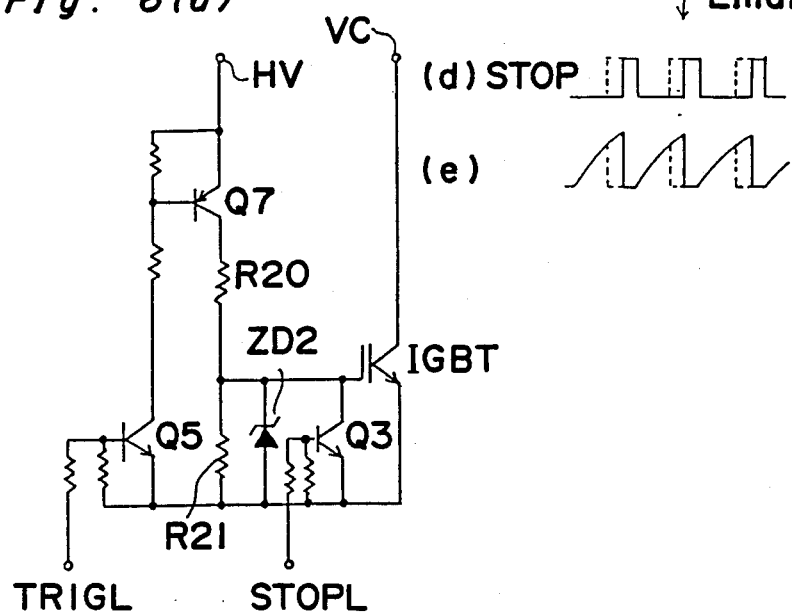

Fig. 9
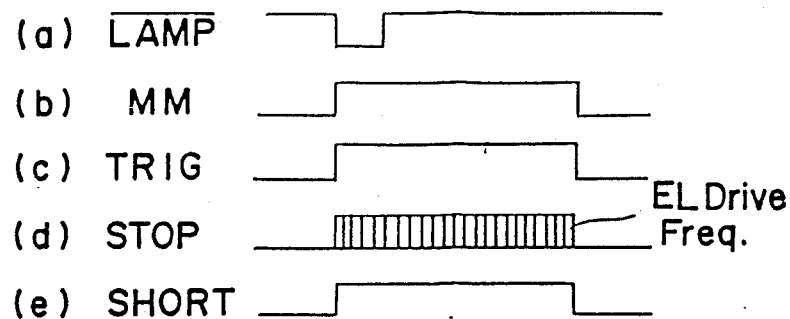
Fig. 10(a)
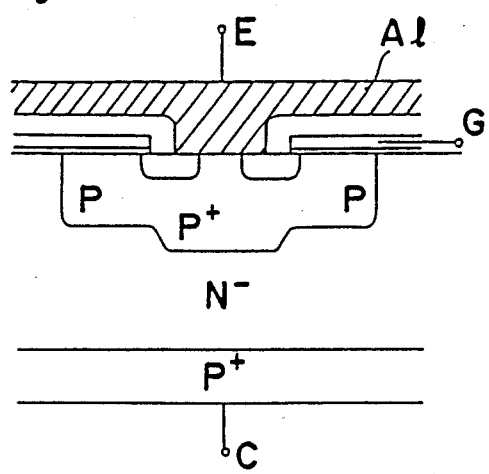
Fig. 10(b)
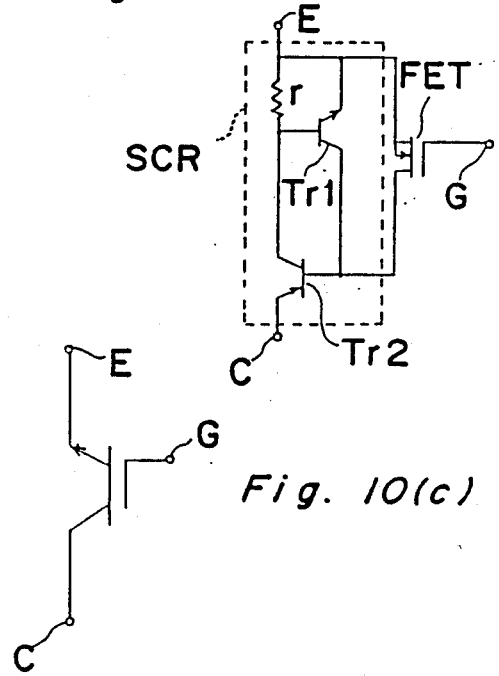
Fig. 10(c)
Fig. 11 Prior Art
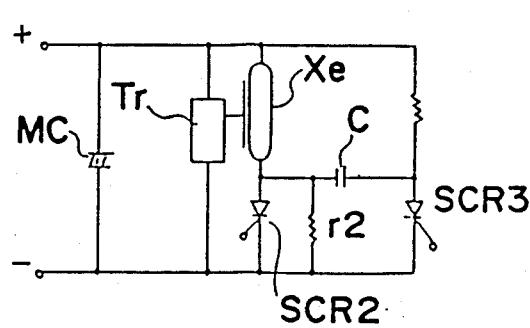
Fig. 12 Prior Art
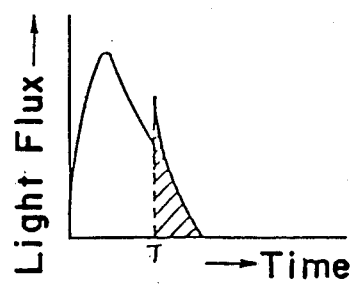

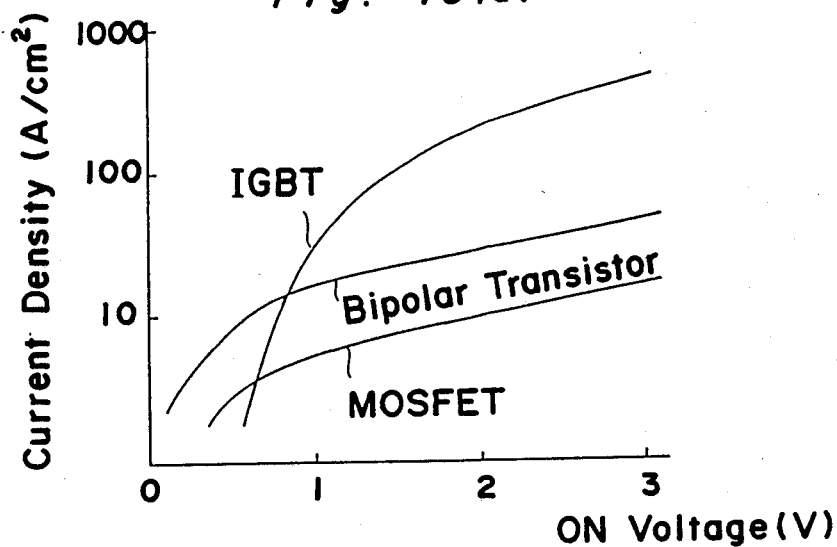
Fig. 10(d)
Fig. 10(e)
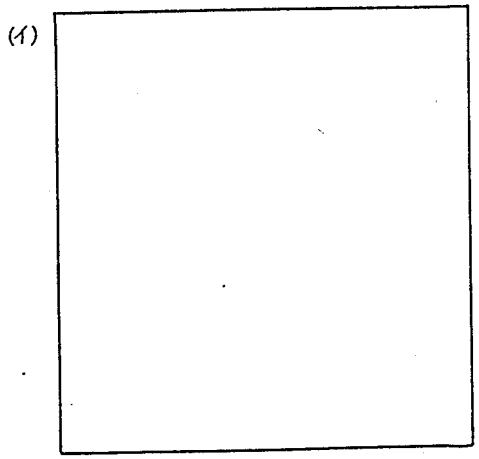
(1)
Fig. 10(f)
Fig. 10(g)

FLASH DEVICE

BACKGROUND OF THE INVENTION

1. Field of the Invention

The present invention generally relates to a flash device for use in association with a photographic camera and, more particularly, to a flash device of a type capable of initiating the firing in response to a flash firing command generated from the photographic camera and interrupting the firing in response to a flash terminating command generated from the photographic camera, the flash device itself, and so on, what is called an "auto strobe".

2. Description of the Prior Art

The flash device has long been well known of a type which comprises a flash tube and a thyristor so connected in series with the flash tube that the flash firing can be controlled by switching the thyristor on and off. An electronic circuit used in such prior art flash device is reproduced in FIG. 11 of the accompanying drawings in schematic block circuit representation. As shown, the thyristor SCR2 is connected in series with the flash tube Xe. When a firing command is generated from the camera body (not shown), a trigger circuit Tr is activated in response to the firing command and, simultaneously therewith, the thyristor SCR2 is switched on, thereby causing the flash tube Xe to fire. When a flash terminating command is generated from the camera body, or a control circuit built in the flash device, immediately after the amount of light emitted has attained a predetermined value, (that is at a timing T shown in FIG. 12) a thyristor SCR3 is switched on in response thereto and the circuit between the anode and cathode of the thyristor SCR2 is reverse-biased by the charge stored in a commutating capacitor C to switch the thyristor SCR2 off thereby to interrupt the flash firing of the flash tube Xe.

In this prior art flash device, since an electric current flows through the flash tube Xe, the commutating capacitor C and the thyristor SCR3 even though the flash terminating command has been generated and the thyristor SCR2 has subsequently been switched off, the flash of light tends to be excessively emitted from the flash device by the amount corresponding to the area hatched in the graph of FIG. 12.

Also, while the commutating capacitor C is charged through resistors r1 and r2, turn-off of the thyristor SCR3 requires the electric current flowing through the thyristor SCR3 to be of a value lower than the holding current and, therefore, the resistor r1 must have a relatively high resistance. This in turn brings about the increased time constant for the charging of the capacitor C and, accordingly, the repeated flash firing at short intervals cannot be accomplished.

Another prior art flash device of a type wherein a field effect transistor is so connected in series with the flash discharge tube that the field effect transistor can be switched on and off by controlling the voltage to be applied between the gate and source of the field effect transistor thereby to control the flash firing is disclosed in the Japanese Laid-open Patent Publication No. 61-50126 published in 1986. In this flash device of the above described type wherein the field effect transistor, or a similar transistor, is employed in place of the thyristor, the flash device itself tends to become bulky by the following reasons although the problems inherent in the prior art flash device shown in and described with reference to FIGS. 11 and 12 could have been eliminated.

(i) Where the transistor is employed, the amplification factor at both a high breakdown voltage and a high current region is so low that, in order for a high discharge current (about one hundred and several tens amperes) to pass from the flash tube, several amperes are required as a current for the control, resulting in the increased size of a circuit for the control of the transistor.

(ii) Where the field effect transistor is employed, the field effect transistor itself tends to become large in size at the high breakdown voltage and the high current region although the control circuit suffices to be small in size.

And further, recently, automation and diversification of photographic techniques have been advanced by allowing a photographic camera body with a microcomputer built therein and a flash device to communicate with each other. As a means for displaying information so communicated between the camera body and the flash device, the flash device is too provided with a data display unit which generally makes use of a liquid crystal display for the purpose of minimizing the electric power consumption. However, the liquid crystal display becomes invisible when in the dark environment and, therefore, the use of a back-lighting device is necessitated to illuminate the liquid crystal display.

As disclosed in, for example, the Japanese Laid-open Utility Model Publication No. 62-116227, an electroluminescent device is generally employed as a light source for the back-lighting the liquid crystal display. Since the electroluminescent device is in the form of a thin film, the use thereof makes it possible to manufacture the display unit compact. Moreover, the electroluminescent device may be referred to as a planar light source, i.e., a light source capable of emitting light from a substantially entire surface area thereof, in contrast to a bulb which may be regarded as a pin-point light source, and, therefore, no substantial fading take place in the display unit. As is well known, the electroluminescent device emits light as a result of repetition of charging and discharging action of a capacitance component thereof.

It has, however, been found that the additional incorporation of a control circuit for controlling the electroluminescent device, that is, for effecting the charging and discharge of the capacitance component of the electroluminescent device, tends to bring about an increased cost and also an increased size of the flash device as a whole, with the consequence that not only is the portability of the flash device lowered, but the handling convenience thereof is also lowered.

SUMMARY OF THE INVENTION

It is an object of the present invention to provide a flash device capable of avoiding any possible excessive flash firing, capable of emitting flash light continuously at short interval, and capable of reducing its size and weight.

It is another object of the present invention to provide a flash device employing an electroluminescent device which is light and compact enough to make it possible to accomplish the cost reduction.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 5(a) is a timing chart showing the operation of the embodiment of FIG. 1 during a normal mode;

FIG. 5(b) is a timing chart showing the operation of the embodiment of FIG. 1 during a high speed synchro mode;

Each of FIGS. 6(a)

FIG. 9 is a timing chart showing the operation of an electroluminescent device;

FIG. 10(a), is a diagram showing a basic structure of an insulated gate bipolar transistor;

FIG. 10(b) is a circuit diagram showing an equivalent circuit of the insulated gate bipolar transistor;

FIG. 10(c) is a diagram showing a symbol of the insulated gate bipolar transistor;

FIG. 10(d) is a graph showing the relationship between the ON voltage and the current density of each of the insulated gate bipolar transistor, MOS field effect transistor and bipolar transistor;

FIGS. 10(e) to 10(g) illustrate respective sizes of the bipolar transistor, the MOS field effect transistor and the insulated gate bipolar transistor, shown for the purpose of comparison in size thereof;

FIG. 11 is a circuit diagram of an essential portion of a conventional auto strobe; and FIG. 12 is a graph showing the characteristic of emission of the conventional auto strobe shown in FIG. 11.

DETAILED DESCRIPTION OF THE EMBODIMENTS

Before the description of the present invention, the insulated gate bipolar transistor (IGBT) will first be described.

The insulated gate bipolar transistor is an element having such a basic structure as shown in FIG. 10(a), an equivalent circuit of which is shown in FIG. 10(b). The symbol of insulated gate bipolar transistor is shown in FIG. 10(c) (as suggested by Joint Electronic Device Engineering Council).

As shown in FIG. 10(b), the insulated gate bipolar transistor has structure including a combination of a thyristor SCR of pnpn structure and a MOS field effect transistor, however, a small resistance r is employed to shortcircuit the base and the emitter of an npn transistor Tr1 to avoid the latch-up of the thyristor SCR (that is, a continued flow of current taking place even when a gate signal is removed). When a voltage is impressed to the gate G of the insulated gate bipolar transistor, the MOS field effect transistor is switched on to allow the electric current to flow from the collector C of the insulated gate bipolar transistor to the emitter E thereof through the thyristor SCR.

As is clear from FIG. 10(a), the insulated gate bipolar transistor has a basic structure similar to a MOS field effect transistor and, therefore, a control circuit can be reduced in size and the turn-on and turn-off time is short. Also, as shown in FIG. 10(d), as compared with a bipolar transistor (Darlington connection) and a MOS field effect transistor, the current density can be increased and, therefore, the size of the insulated gate bipolar transistor can be reduced as compared with a bipolar transistor and a MOS field effect transistor. For the purpose of comparison, the size of a chip of the insulated gate bipolar transistor required to render the ON voltage to be 3 volts when an electric current of 25 A flows is as shown in FIG. 10(g) while those of a MOS field effect transistor and a bipolar transistor are as shown in FIGS. 10(e) and 10(f), respectively.

The insulated gate bipolar transistor is detailed in "Nikkei Electronics", the issue of May 19, 1986, No. 395, p. 182 to p. 185.

One embodiment of a flash device in which the present invention is embodied will no be described.

Figure 1:
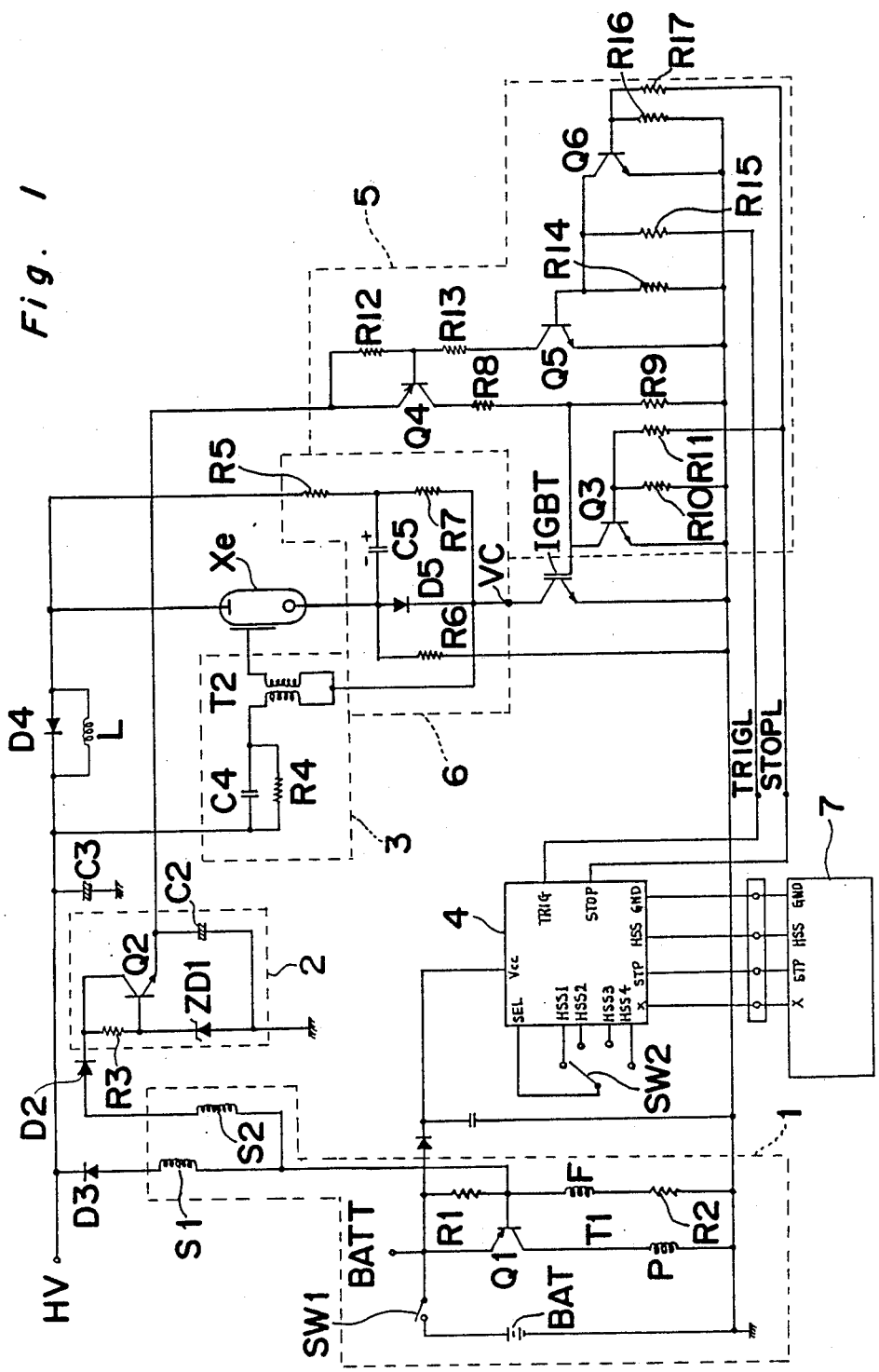
FIG. 1 is a circuit diagram of a flash device embodying the present invention.

FIG. 1 is an entire circuit diagram of a flash device embodying the present invention. Referring to FIG. 1, the flash device shown therein includes a DC-DC converter 1 including a direct current power source BAT, which is constituted by an oscillating transistor Q1, resistors R1 and R2, and an oscillating transformer T1. A capacitor C1 is charged through a rectifying diode D1 and acts as a power source for a control circuit 4.

The oscillating transformer T1 includes a primary winding P, secondary windings S1 and S2, and an auxiliary winding F, and a main capacitor C3 is connected to the secondary winding S1 through a rectifying diode D3. Thus, after the voltage of the power source BAT has been boosted by the transformer T1 and rectified by the diode D3, the main capacitor C3 is charged.

The main capacitor C3 is connected to a trigger circuit 3 for exciting a flash tube Xe, to the flash tube Xe through a delay circuit including a coil L and a diode D4, and to a voltage doubler 6 for impressing a doubled voltage to the flash tube Xe. By the insertion of the delay circuit, no charge move quickly from the main capacitor C3 to the flash tube Xe and, therefore, any possible excessive flash lighting because of a delay in a control circuit 4 and others can advantageously be minimized.

The trigger circuit 3 is a well-known circuit having a capacitor C4, a resistor R4 and a transformer T2.

The voltage doubler 6 is comprised of a resistor R5 and a capacitor C5 both connected in parallel to the flash tube Xe, a resistor R6 and a diode D5 both connected to the juncture of the capacitor C5 and a negative terminal of the flash tube Xe, and a resistor R7 connected to the juncture of the resistor R5 and the capacitor C5.

A constant voltage generating circuit 2 is connected with the secondary winding S2 of the oscillating transformer T1 through a rectifying diode D2. This constant voltage generating circuit 2 supplies a constant voltage to a flash firing control circuit 5 controlled by the control circuit 4 and is comprised of a transistor Q2 having the collector to which a cathode of the diode D2 is connected, a Zener diode ZD1 having its cathode and anode connected respectively to the base of the transistor Q2 and to the ground, a resistor R3 connected between the collector and the base of the transistor Q2, and a capacitor C2 connected to the emitter of the transistor Q2 and operable as a drive power source for the flash firing control circuit 5.

The flash firing control circuit 5 is a circuit operable to control the flash firing of the flash tube Xe by controlling the ON-OFF of the insulated gate bipolar transistor IGBT and is constituted by four transistors Q3 to Q6 and ten resistors R8 to R17.

The control circuit 4 is connected through terminals X, STP and HSS with a control circuit 7 built in a camera body, through which terminals various signals are transmitted between these control circuits 4 and 7. The control circuit 4 is also connected with a high speed synchro changeover switch SW2 and has a power source terminal Vcc to which the capacitor C1 is connected. The details of this control circuit 4 will be described later.

It is to be noted that the number of turns of each of the secondary windings S1 and S2 is so selected that, when the main capacitor C3 has been charged to a voltage required to fire the flash tube Xe, the capacitor C2 can be charged to a voltage required to drive the insulated gate bipolar transistor IGBT.

Figure 2:
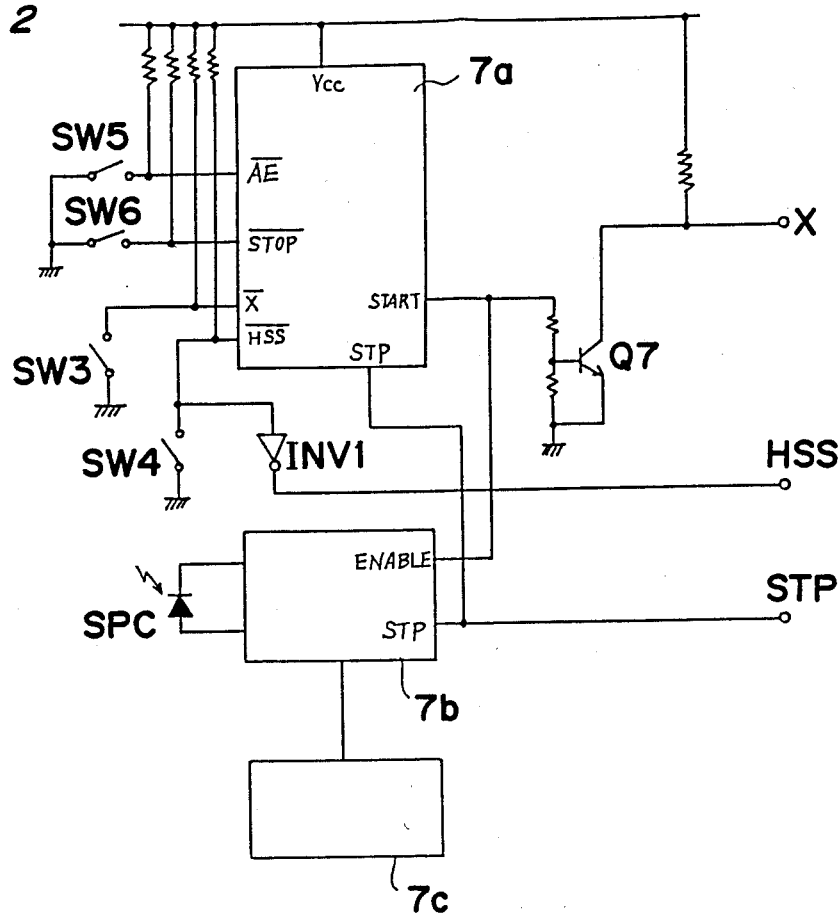
FIG. 2 is a circuit diagram of an essential portion of the circuit built in a camera body.

FIG. 2 is a block circuit diagram showing the control circuit 7 built in the camera body. It is to be noted that this camera is equipped with a focal plane shutter assembly and is of a type capable of being switched over between two flash photography modes as will be described later.

Referring to FIG. 2, reference numeral 7a represents a in-body control circuit built in the camera body. This in-body control circuit 7a has a terminal $\overline{X}$ to which a synchro switch SW3 is connected, a terminal $\overline{HSS}$ to which a high speed synchro selector switch SW4 is connected, a terminal $\overline{AE}$ to which a switch SW5 is connected, and a terminal $\overline{STOP}$ to which a switch SW6 is connected. The synchro switch SW3 is adapted to be switched on upon the completion of travel of the first blind of the shutter. The switch SW4 is connected with a terminal HSS of the control circuit 4 through an inverter INV1. The switch SW5 is adapted to be switched on upon the start of travel of the first blind of the shutter. The switch SW6 is adapted to be switched on upon the completion of travel of the second blind of the shutter. The control circuit 7a also has a terminal START. This control circuit 7a outputs a high level signal from the terminal START when a low level signal is inputted to the terminal $\overline{X}$ during a period in which a high level signal is inputted to the terminal $\overline{HSS}$ and, also, outputs a high level signal from the terminal START when a low level signal is inputted to the terminal $\overline{AE}$ during a period in which a low level signal is inputted to the terminal $\overline{HSS}$.

The terminal START of the circuit 7a is connected with a terminal X of the control circuit 4 through a switching transistor Q7, and a terminal STP is connected with a terminal STP of a light measuring circuit 7b and also with a terminal STP of the control circuit 4.

The light measuring circuit 7b is operable to integrate the amount of light reflected from a film plane or a surface of the shutter curtain and then received by a light receiving element SPC during a period in which a high level signal is inputted to a terminal ENABLE connected with 7c, the terminal START of the in-body control circuit 7a. This light measuring circuit 7b is also operable to receive film sensitive information, read out from a film cartridge or set by a circuit 7c, and then to correct the measured light value in accordance with the film sensitivity. When the integrated value attains a proper light amount, a flash firing terminating pulse is outputted from the terminal STP. Also, when the switch SW6 is switched on upon the completion of travel of the second blind of the shutter and the terminal $\overline{STOP}$ is subsequently rendered in a low level state, the in-body control circuit 7a outputs a low level signal from the terminal START to stop the operation of the light measuring circuit 7b.

Figure 3:
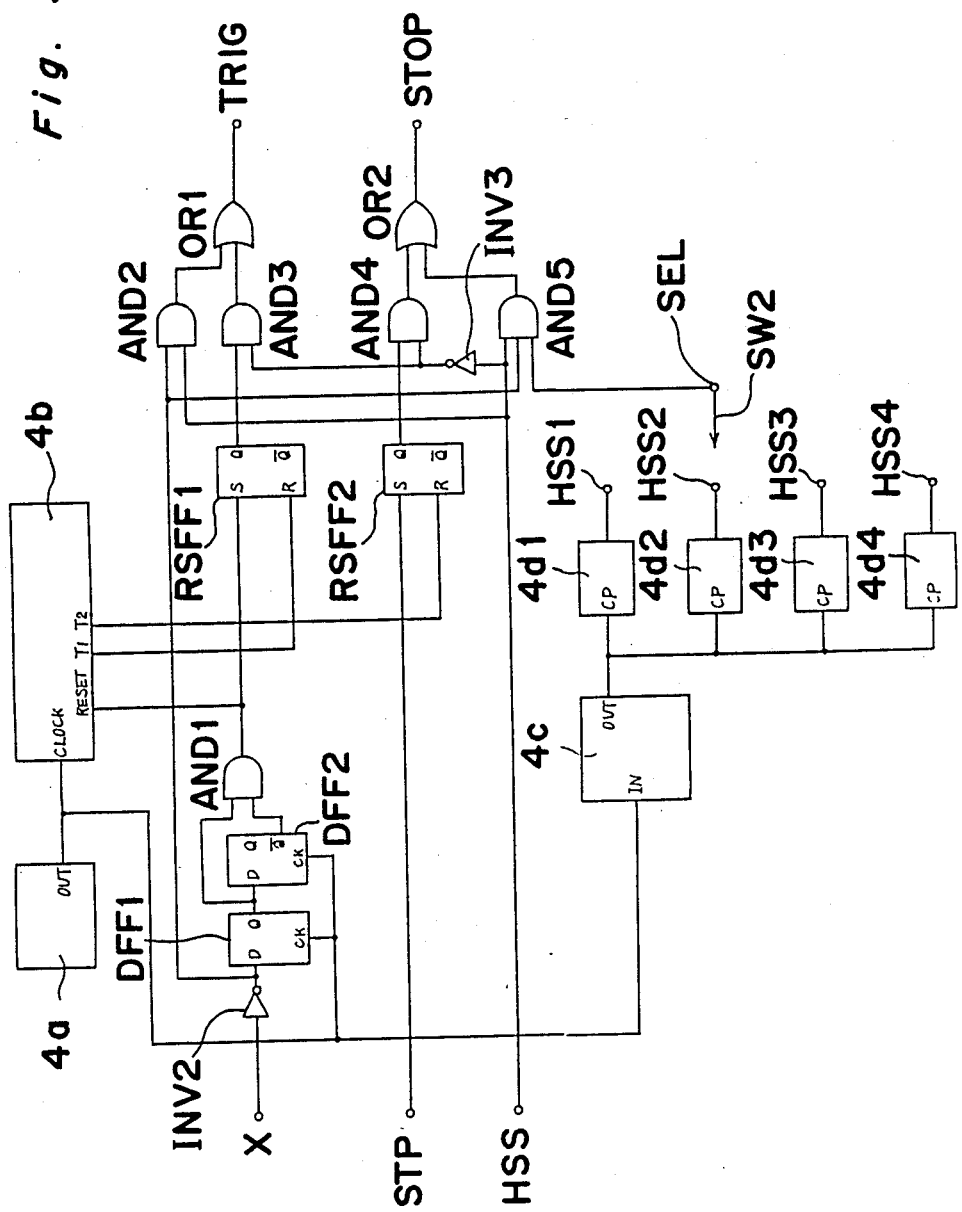
FIG. 3 is a circuit diagram of a control circuit shown in FIG. 1.

FIG. 3 is a circuit diagram showing the control circuit 4. Referring now to FIG. 3, the control circuit 4 includes an oscillating circuit 4a for outputting clock pulses. The clock pulses are counted by a counter 4b which outputs a high level signal from a terminal T1 when a first predetermined number of the pulses has been counted thereby and the counter 4b also outputs a high level signal from a terminal T2 thereof when a second predetermined number of pulses, which is greater than the first predetermined number of pulses, has been counted. The clock pulses are also inputted to a circuit 4c operable to generate high speed synchro reference pulses, and a frequency f(Hz) of the high speed synchro reference pulses is so selected as to satisfy the following condition:

$$T \cdot f \geqq 50,$$

wherein T(sec) represents the length of time required for the shutter curtain to completely travel across a framed imaging area. It has been experimentally ascertained that, as far as this condition is satisfied, unevenness does not occur even when the flash device is fired intermittently during the movement of the first blind of the shutter. The duty factor of the high speed synchro reference pulses is so selected as to be smaller (for example, 5%) than the minimum duty factor of all set by duty factor control circuits 4d1 to 4d4 as will be described subsequently.

Figure 4A:
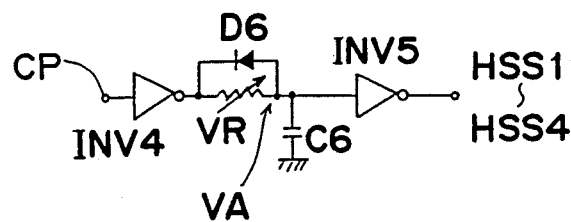
FIG. 4(a) is a circuit diagram of a duty factor control circuit shown in FIG. 3.
Figure 4B:
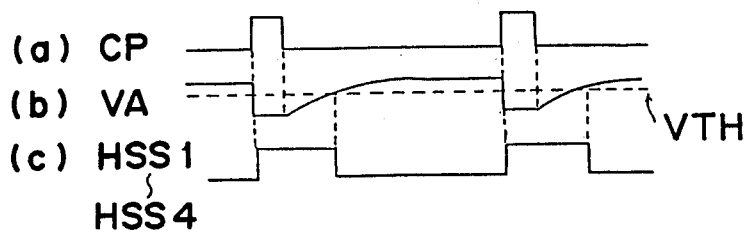
FIG. 4(b) is a timing chart showing the operation of the duty factor control circuit of FIG. 4(a)

Each of the duty factor control circuits 4d1 to 4d4 is of a structure as shown in FIG. 4(a) and operates in accordance with the timing chart shown in FIG. 4(b).

Referring to FIG. 4(a), when a low level signal is inputted to a terminal CP, an output of an inverter INV4 is rendered in a high level state, allowing a capacitor C6 to be charged through a variable resistor VR. Since an input VA of an inverter INV5 is in a high level state during a condition in which the capacitor C6 is charged to a level equal to the output of the inverter INV4, terminals HSS1 to HSS4 are rendered in a low level state. When during this the level at the terminal CP changes from the low level state to a high level state, the output of the inverter INV4 is rendered in a low level state and the capacitor C4 is quickly discharged through a diode D4. As a result thereof, input VA of the inverter IV5 is rendered in a low level state and the terminals HSS1 to HSS4 are consequently rendered in a high level state. If the level at the terminal CP subsequently changes to the low level state, the capacitor C6 is again charged through the variable resistor VR. Change in voltage being charged at this time is shown by waveforms (b) and (c) in FIG. 4(b). When the input VA of the inverter INV5 attains a threshold value Vth, the output of the inverter INV5, that is, the terminals HSS1 to HSS4, is reversed to a low level state. The length of time required for the input of the inverter INV5 to attain the threshold value is fixed by a time constant determined by the resistance of the variable resistor VR and the capacitance of the capacitor C6 and, therefore, adjustment of the variable resistor VR results in change of the duty factor of the pulses outputted from the terminals HSS1 to HSS4. In the illustrated embodiment, the duty factors of the pulses outputted from the associated duty factor control circuits 4d1 to 4d4 are chosen to be 75%, 50%, 25% and 12.5%, respectively.

Referring back to FIG. 3, an input terminal of an inverter INV2 is connected through the terminal X with the collector of the transistor Q7 in the control circuit 7 built in the camera body, and an output terminal of the inverter INV2 is connected to a D-flip-flop DFF1 and also to an AND gate AND2. The D-flip-flop DFF1, together with a D-flip-flop DFF2 and an AND gate AND1, comprises a known one-shot pulse generator.

An R-S flip-flop RSFF1 is adapted to be set by said one-shot pulse and reset by a high level signal outputted from a terminal T1 of the counter 4b after the counter 4b has counted the first predetermined number of the clock pulses. An R-S flip-flop RSFF2 is adapted to be set by the flash firing terminating pulse inputted from the camera body through the terminal STP and reset by a high level signal outputted from a terminal T2 of the counter 4b. The counter 4b is adapted to be reset by the one-shot pulse outputted from said one-shot pulse generator DFF1, DFF2, AND1.

Other than the foregoing elements, the control circuit 4 also includes two multiplexers comprised of two AND gates AND2 and AND3 (AND4 and AND5), an OR gate OR1 (OR2) and an inverter INV3.

Hereinafter, the operation of the flash device of the above described structure according to the preferred embodiment of the present invention will be described.

When the switch SW1 is switched on, the control circuit 4 is powered to operate. Simultaneously therewith, the DC-DC converter 1 is activated to allow the main capacitor C3 and the voltage doubling capacitor C5 to be charged. Also, an electric power is supplied to the constant voltage generating circuit 2 through the secondary winding S2 to activate the circuit 2 to permit the flash firing control circuit 5 to be powered to establish a flash firing ready condition.

The case with the photo-taking situation under normal flash photography will first be described. At this time, on the side of the camera body the high speed synchro selector switch SW4 is switched off to set the normal mode. Then, the high level signal is inputted to the terminal $\overline{HSS}$ of the in-body control circuit 7a and, at the same time, the low level signal is inputted to the terminal HSS of the control circuit 4 through the inverter INV1. Thereby, the AND gates AND2 and AND5 cut off, and the AND gates AND3 and AND4 conduct.

When the camera is released by the manipulation of a release operating means (not shown), the first blind of the shutter travels after a series of operations. When the synchro switch SW3 is switched on upon the completion of travel of the first blind, a low level signal is inputted to the terminal X of the in-body control circuit 7a. The control circuit 7a, when detecting this, outputs a high level signal from the terminal START and the high level signal is inputted to the terminal ENABLE of the light measuring circuit 7b to initiate a light measurement. At the same time, the transistor Q7 is switched on to apply a low level signal to the inverter INV2 in the control circuit 4 through the terminal X (See the waveform (a) in FIG. 5(a)) to make the output of the inverter INV2 to be in a high level state wherefore one-shot pulse of a length equal to one cycle of the clock pulses is generated from the AND gate AND 1 (See the waveform (b) in FIG. 5(a)). It is to be noted that, although at this time the output from the inverter INV2 is inputted to the AND gate AND2 which is then cut off, the AND gate AND2 remains generating a low level signal. The above mentioned one-shot pulse is used to set the R-S flip-flop RSFF and is inputted to the counter 4b to reset the counter 4b. After the counter 4b has been reset, the counter 4b counts the clock pulses from the oscillator 4a.

When the R-S flip-flop RSFF1 has been set by the one-shot pulse referred to above, a trigger signal is generated from a terminal TRIG to the flash firing control circuit 5 through the AND and OR gates AND3 and OR2 which then conduct (See the waveform (c) in FIG. 5(a)).

When the trigger signal is generated from the terminal TRIG, the base of the transistor Q5 is rendered in a high level state through the resistor R15 and, therefore, the transistor Q5 is switched on. Then, the base of the transistor Q4 is rendered in a low level state and the transistor Q4 is switched on. On the other hand, since a low level signal is outputted from the terminal STP of the light measuring circuit 7b up until a proper exposure is obtained, the R-S flip-flop RSFF2 remains reset. That is, the control circuit 4 remains generating a low level signal from the terminal STOP and the transistors Q3 and Q6 remain switched off. Accordingly, a voltage is applied to the gate of the insulated gate bipolar transistor IGBT through the resistor R8 to switch the insulated gate bipolar transistor IGBT on.

It is to be noted that, the gate of the insulated gate bipolar transistor IGBT has a capacitor component, so the resistance R8 is set less than or equal to a several kilo-ohms in order to improve a response of the insulated gate bipolar transistor IGBT.

When the insulated gate bipolar transistor IGBT is switched on this way, the current charged on the capacitor C4 flows through the trigger capacitor C4 and the primary winding of the transformer T2 and, accordingly, a trigger pulse is generated from the secondary winding of the transformer T2. Simultaneously therewith, a positive side of the voltage doubling capacitor C5 is grounded through the resistor R7 and the insulated gate bipolar transistor IGBT. Assuming now that the charging voltage of the main capacitor C3 is expressed by HV(V), the potential of a minus side of the capacitor C5 is −HV(V) and, therefore, a voltage 2 HV(V) which is twice the charging voltage of the main capacitor C3 is applied to the flash tube Xe. Thus, the flash tube Xe is assuredly caused to fire.

After the flash photography has been carried out and a proper light amount has been obtained, the flash firing terminating pulse (See the waveform (d) in FIG. 5(a)) is outputted from the light measuring circuit 7b. The in-body control circuit 7a when receiving this pulse causes the second blind of the shutter to travel. Also, the flash firing terminating pulse is inputted to the control circuit 4 through the terminal STP, wherefore the R-S flip-flop RSFF2 is set to cause the terminal STOP to generate the flash firing terminating signal ("H") to the flash firing control circuit 5 through the AND and OR gates AND4 and OR2 (See the waveform [e] in FIG. 5(a)).

When the flash firing terminating signal is generated from the terminal STOP of the control circuit 4, the transistors Q3 and Q6 are switched on through the resistors R11 and R17, respectively.

When the transistor Q3 is so switched on, the gate of the insulated gate bipolar transistor IGBT is grounded and the insulated gate bipolar transistor IGBT is therefore switched off. As a result thereof, no discharge current flow from the flash tube Xe with the flash firing consequently interrupted. Since the discharge current of the flash tube Xe is controlled by the ON-OFF of the insulated gate bipolar transistor IGBT, any possible excessive flash firing can be avoided unlike the conventional auto strobe device utilizing the commutating capacitor to interrupt the flash firing. Also, since a turn-off circuit comprised of the reverse-flow capacitor and others is not required, the continuously synchronized flash firing is possible at short intervals, with no problem accompanied, merely by causing the insulated gate bipolar transistor IGBT to be switched on and off according to the photo-taking operation.

When the transistor Q6 is switched on, the base of the transistor Q5 is grounded and the transistor Q5 is therefore switched off, followed by the switching off of the transistor Q4. Thereby, during a period in which the flash firing terminating signal is generated, the discharge of the capacitor C2 through the transistor Q4, the resistor R8 and the transistor Q3 can be avoided to minimize any possible waste of energies.

When the counter 4b having counted the first predetermined number of the pulses outputs a high level signal from the terminal T1, the R-S flip-flop RSFF1 is reset and the trigger signal disappears, that is, a low level signal is outputted from the terminal TRIG. Thereby, the transistors Q5 and Q4 are switched off. It is, however, to be noted that the period from the timing at which the counter 4b is reset to the timing at which the high level signal is outputted from the terminal T1, that is, the time during which the trigger signal is generated, is so selected as to permit the flash tube Xe to emit the full flash of light.

When the counter 4b has counted the second predetermined number of the pulses, it outputs a high level signal from the terminal T2. Then, the R-S flip-flop RSFF2 is reset and the trigger signal disappears, that is, a low level signal is outputted from the terminal STOP. Thereby, the transistors Q3 and Q6 are switched off. It is, however, to be noted that the period from the timing at which the counter 4b is reset to the timing at which the high level signal is outputted to the terminal T2, that is, the period from the timing at which the trigger signal has been generated to the timing at which the flash firing terminating signal disappears is, as hereinbefore described, so selected as to be longer than the time during which the trigger signal is generated. This is for the purpose of avoiding the possibility that, after the flash firing terminating signal has disappeared during the generation of the trigger signal, the transistor Q5 may be again switched on and the transistors Q3 and Q6 may be switched off to fire the flash tube Xe.

When the switch SW6 is switched on upon the completion of the travel of the second blind of the shutter, the in-body control circuit 7b outputs a low level signal from the terminal START, and then a high level signal is inputted to the inverter INV2 through the terminal X (See the waveform (a) shown in FIG. 5(a)).

The operation during the selection of the high speed synchro mode will now be described. When the high speed synchro selector switch SW4 is switched on during the flash firing ready condition, a low level signal is inputted to the terminal $\overline{HSS}$ of the in-body control circuit 7a and, at the same time, a high level signal is inputted to the terminal HSS of the control circuit 4 through the inverter INV1. Thereby, the AND gates AND2 and AND5 conduct and the AND gates AND3 and AND4 are cut off.

Subsequently, by the manipulation of the high speed synchro switch SW2, a desired duty factor is selected.

When the camera is released by the manipulation of the release operating means (not shown) as is the case with the normal flash photography described hereinbefore, the first blind of the shutter starts to travel after a series of operations and, at the same time, the switch SW5 is switched on, followed by the generation of a high level signal from the terminal START of the in-body control circuit 7a to activate the light measuring circuit 7b.

Simultaneously therewith, the terminal X of the control circuit 4 is rendered in a low level state (See the waveform (a) shown in FIG. 5(b)), and the counter 4b is reset by the one-shot pulse from the AND gate AND1. It is, however, to be noted that, since the AND gate AND3 is cut off, the signal from the R-S flip-flop RSFF1 is cut. On the other hand, the high level signal outputted from the inverter INV2 is transmitted as a trigger signal from the terminal TRIG to the flash firing control circuit 5 through the AND gate AND2 and the OR gate OR1 (See the waveform (b) shown in FIG. 5(b)). When the trigger signal and the flash firing terminating signal are generated from the terminals TRIG an STOP of the control circuit 4, the flash tube Xe is fired and terminated as is the case during the normal flash photography.

It is eventually pointed out that, while pulses of such a waveform as shown by (c) in FIG. 4(b) are outputted from the terminals HSS1 to HSS4 of the duty factor control circuits 4d1 to 4d4, these pulses are inputted to the AND gate AND5 through the switch SW2. Accordingly, so long as the high speed synchro mode is selected and the trigger signal is generated, pulses, whose frequency is f, having a duty factor selected by the manipulation of the switch SW2 are generated from the AND gate AND5. Since these pulses are applied from the terminal STOP to the base of the transistor Q6 through the OR gate OR2 and the resistor R17, the flash tube Xe is intermittently fired at a duty factor selected and set by the manipulation of the switch SW2 and at the frequency f of the high speed synchro reference pulses as shown by waveforms (d) and (e) in FIG. 5(b). As can be understood from the waveform (d) and (e) in FIG. 5(b), the amount of flash light can be varied by varying the duty factor (for example, for a change in duty factor from 50% to 25%, only 1 Ev changes). When the light amount is varied, for the same object to be photographed with a given aperture, the outputting timing of the flash firing terminating pulses from the light measuring circuit 7 varies and the timing at which the second blind of the shutter starts its travel can be varied. In other words, by changing the duty factor by the manipulation of the high speed synchro changeover switch SW2, the flash photography is possible with a desired shutter speed.

It is to be noted that, even when the insulated gate bipolar transistor IGBT is again switched on after the flash firing of the flash tube Xe has been terminated, no trigger pulse is generated from the trigger circuit 3 provided that the trigger capacitor C4 remains charged. However, since the flash tube Xe once fired assumes an excited condition for a moment (a few milliseconds), the flash tube Xe can be re-fired upon the switching on of the insulated gate bipolar transistor IGBT even though no trigger pulse is generated.

When the high level signal is inputted to the terminal X of the control circuit 4 upon the completion of travel of the second blind of the shutter, the respective outputs from the OR gates OR1 and OR2 are rendered in a low level state and the flash firing is terminated.

Modifications of the above described embodiment of the present invention will now be described.

FIG. 6 is a circuit diagram showing a modification of the flash firing control circuit 5. In this modification, the constant voltage circuit used in the embodiment shown in FIG. 1 is not provided. With respect to the terminals HV, etc., shown in FIG. 6, reference should be made to FIG. 1.

In a modification shown in FIG. 6(a), a drive voltage for the insulated gate bipolar transistor IGBT originates from the main capacitor C3. When the trigger signal ("H") is inputted to a terminal TRIGL, the transistors Q5 and Q7 are switched on to allow a predetermined voltage, determined by a Zener diode ZD2, to be applied to the gate of the insulated gate bipolar transistor IGBT to switch the insulated gate bipolar transistor IGBT on. When the flash firing terminating signal ("H") is inputted from a terminal STOPL, the transistor Q3 is switched on and the insulated gate bipolar transistor IGBT is switched off.

Figure 6B:
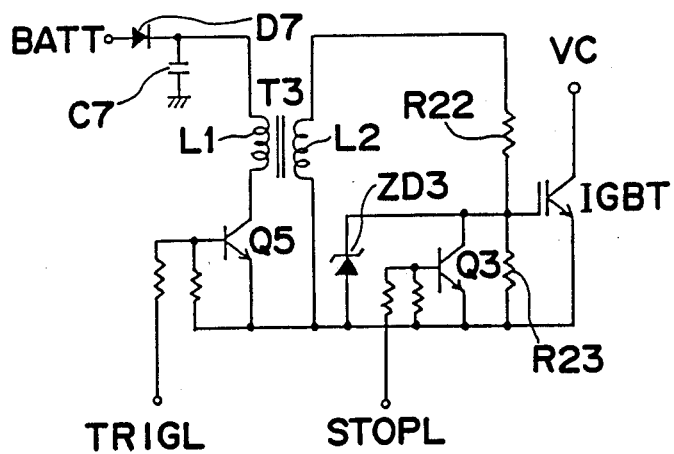
FIG. 6(b) is a circuit diagram showing modifications of a flash firing control circuit used in the embodiment of FIG. 1.

In a modification shown in FIG. 6(b), the drive voltage for the insulated gate bipolar transistor IGBT originates from a capacitor C7 through the pulse transformer. The capacitor C7 is charged by the direct current power source BAT through a rectifying diode D7. During a period in which the trigger signal ("H") is inputted to the terminal TRIGL, the transistor Q5 is switched on and the discharge current from the capacitor C7 flows through a primary winding L1 of a pulse transformer T3. Thereby, an induced current flow through a secondary winding L2 of the pulse transformer T3 and a predetermined voltage determined by a Zener diode ZD3 is applied to the gate of the insulated gate bipolar transistor IGBT through a resistor R22 to switch the insulated gate bipolar transistor IGBT on. Then, when the flash firing terminating signal ("H") is inputted from the terminal STOPL, the transistor Q3 is switched on and the insulated gate bipolar transistor IGBT is switched off.

According to these modifications, the number of turns of the windings L1 and L2 is so selected that the voltage required to switch the insulated gate bipolar transistor IGBT can be applied to the gate of the insulated gate bipolar transistor IGBT even when the the voltage available from the direct current power source BAT is a minimum voltage required to drive the control circuit 4. Because of this, the higher the voltage of the direct current power source BAT, the higher the charging current of the capacitor C7 and, therefore, the higher the current flowing through the winding L1, resulting in the possibility that the voltage higher than the rated voltage may be applied to the gate of the insulated gate bipolar transistor IGBT. Therefore, the Zener diode ZD3 is provided so that the predetermined voltage can be applied to the gate of the insulated gate bipolar transistor IGBT. Accordingly, the Zener diode ZD3 may be removed by causing the voltage of the direct current power source BAT to be stabilized.

It is to be noted that, in the foregoing embodiment, reference has been made to the flash device wherein the insulated gate bipolar transistor IGBT is switched off in response to the flash firing terminating signal generated from the light measuring circuit built in the camera body. However, the present invention can be applicable to a flash device incorporating a light receiving unit for measuring the amount of light reflected from the object to be photographed and a light measuring circuit.

Another preferred embodiment of the present invention will now be described with reference to FIG. 7. The flash device according to this embodiment is provided with an electroluminescent device EL. This electroluminescent device EL emits light when the charging and discharging of a capacitor component thereof are repeated, and is used for back lighting for a liquid crystal display unit of the flash device or any other purpose. It is to be noted that, since the flash device according to this embodiment is substantially identical with that according to the embodiment of FIG. 1, like parts shown in FIG. 7 are shown by like reference numerals used in FIG. 1 for the sake of brevity.

Figure 7:
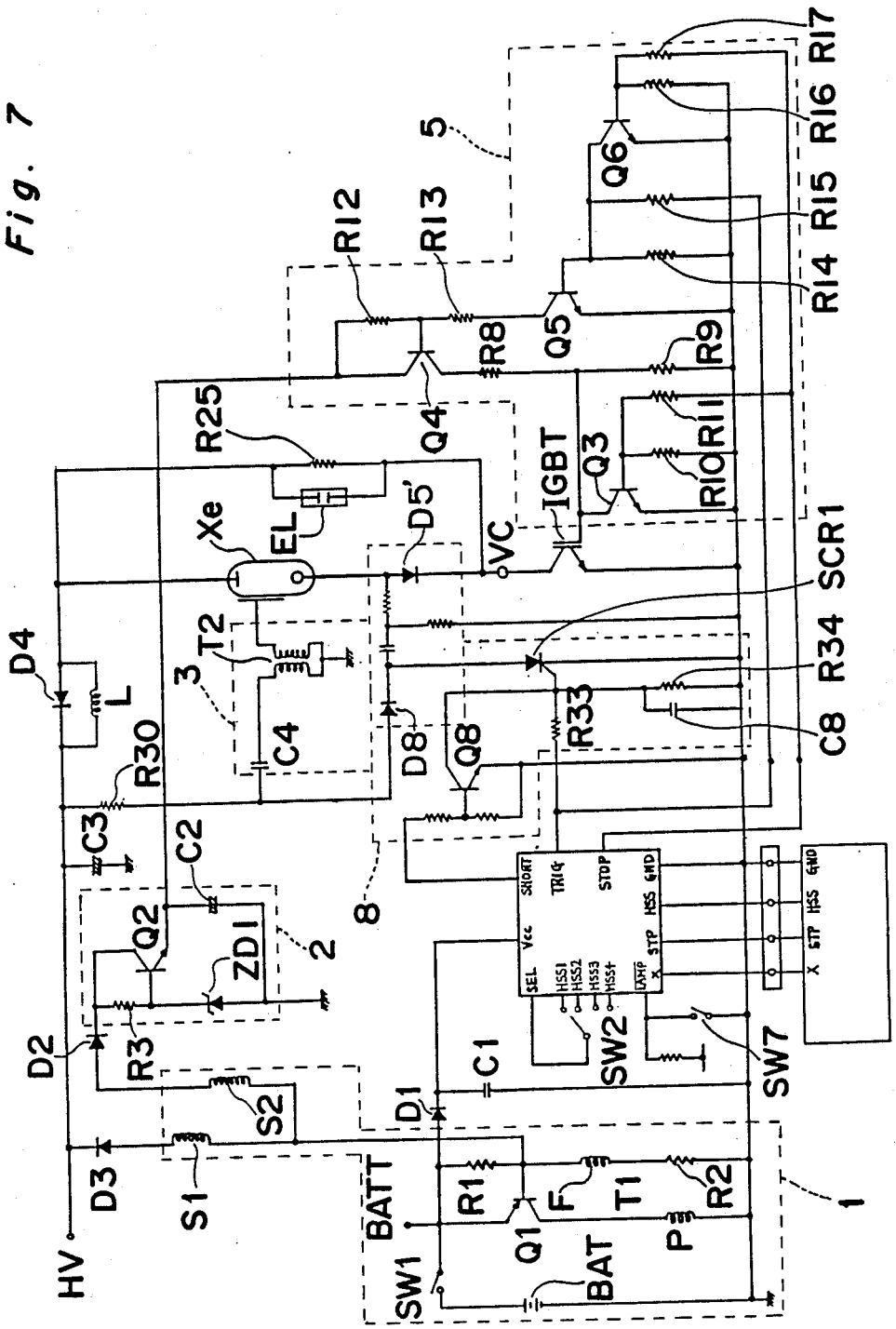
FIG. 7 is a circuit diagram of the flash device according to another embodiment of the present invention.

Referring now to FIG. 7, the trigger circuit 3 is comprised of the trigger capacitor C4 and the oscillating transformer T2 and, when the capacitor C4 is discharged, the trigger pulse is generated from the oscillating transformer T2.

The voltage doubling circuit 6 is connected to the main capacitor C3 through a resistor R30 and a diode D8. A diode D5' serves to avoid any possible back flow of current from emitter to collector of the insulated gate bipolar transistor IGBT, or from gate to collector, in the event that the minus side of the capacitor C5 drops abruptly.

Reference numeral 8 represents a switching circuit for switching over between the light emission of the flash tube Xe and the light emission of the electroluminescent device EL. This switching circuit 8 includes, inter alia, a capacitor C8, a transistor Q8 and a thyristor SCR1 connected to the cathode of a diode D8. It is to be noted that the resistance of a resistor R30 is so selected that, when the gate of the thyristor SCR1 is reversed from a high level state to a low level state, the thyristor SCR1 can be turned off.

Also, as shown in FIG. 7, a terminal SHORT of the control circuit 4 in this embodiment is connected with the base of the transistor Q8 and a terminal $\overline{\text{LAMP}}$ thereof is connected with a lamp switch SW7.

Figure 8:
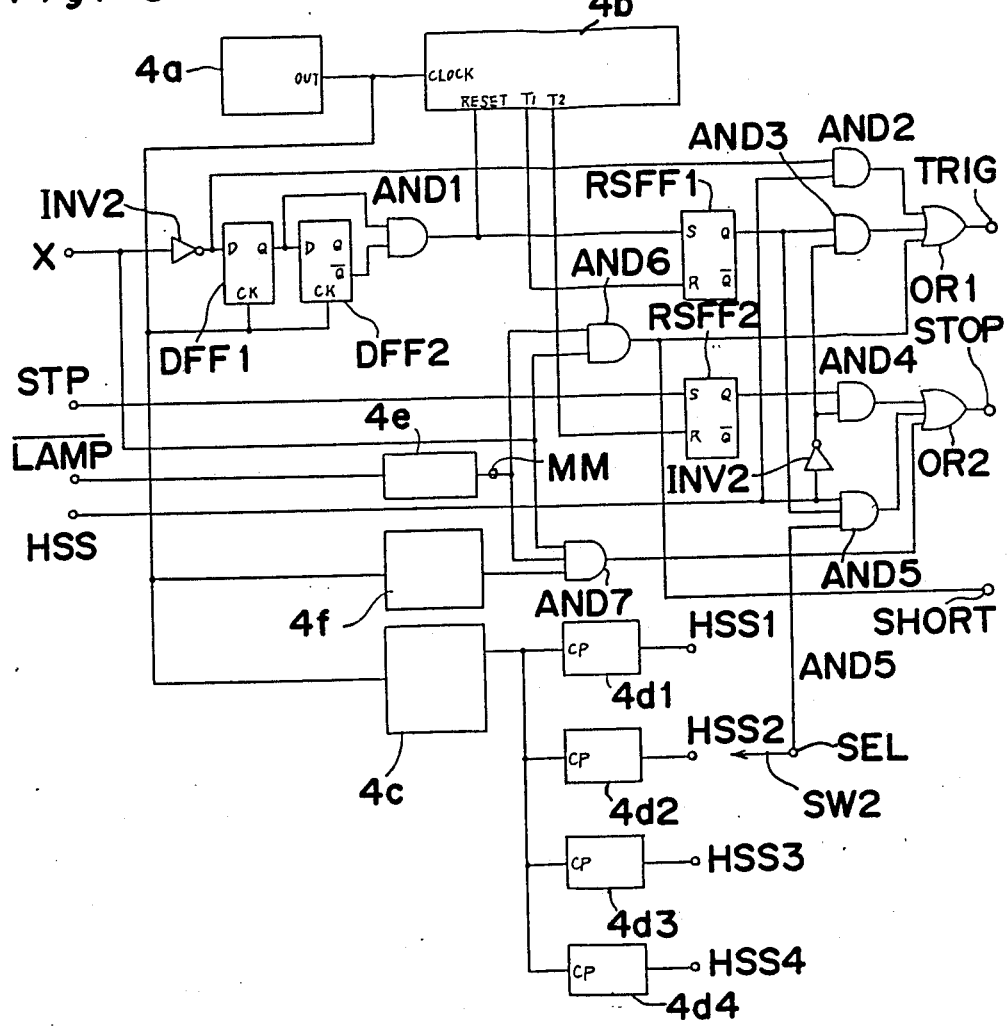
FIG. 8 is a circuit diagram of a control circuit shown in FIG. 7.

FIG. 8 is a circuit diagram showing a specific example of the control circuit 4 shown in FIG. 7.

Referring to FIG. 8, reference numeral 4e represents a one-shot monomultivibrator circuit which is connected to the switch SW7 through the terminal $\overline{\text{LAMP}}$. This circuit 4e, when an input terminal is reversed from a high level state to a low level state, outputs from an output terminal a high level signal for a predetermined time. Reference numeral 4f represents an electroluminescent device EL drive frequency generator.

Hereinafter, the flash device according to this embodiment will be described.

When the switch SW1 is switched on, the DC-DC converter 1 is activated to allow the main capacitor C3, the trigger capacitor C4 and the voltage doubling capacitor C5 to be charged as is the case with the foregoing embodiment. The capacitor C2 in the constant voltage circuit 2 is also charged to establish the flash firing ready condition.

During the normal flash photography, as is the case with the foregoing embodiment, the transistors Q5 and Q4 are switched on upon the completion of travel of the first blind of the shutter and the insulated gate bipolar transistor IGBT is switched on. Simultaneously therewith, a high voltage signal is applied to the gate of the thyristor SCR1. Since at this time the transistor Q7 is switched on the AND gates AND6 and AND7 are cut off and a low level signal is applied to the base of the transistor Q8 to switch the transistor Q8 off. Accordingly, the thyristor SCR1 is switched on and the charge accumulated in the trigger capacitor C4 is discharged through the diode D6, the thyristor SCR1 and the primary winding of the transformer T2, thereby exciting the flash tube Xe. Also, the plus side of the capacitor C5 is of a ground potential level and the voltage of a value twice the charged voltage of the main capacitor C3 is applied to the flash tube Xe. As a result thereof, the charge accumulated in the main capacitor C3 is discharged through the flash tube Xe, the diode D5 and the insulated gate bipolar transistor IGBT, causing the flash tube Xe to be assuredly fired. Subsequently, when an exposure gets proper, the transistors Q3 and Q5 are switched on and the insulated gate bipolar transistor IGBT is switched off to terminate the flash firing.

With respect to the selection of the high speed synchro mode, it is similar to that described in connection with the foregoing embodiment and, therefore, the description thereof will not be reiterated.

The operation of the electroluminescent device EL will now be described.

Since during the flash firing ready condition the transistor Q7 in the camera body is switched off, a high level signal is inputted to the terminal X of the control circuit 4 and, accordingly, the AND gates AND6 and AND7 conduct. When under this condition the switch SW7 is switched on (See the waveform (a) shown in FIG. 9) in an attempt to illuminate the liquid display unit, the terminal $\overline{\text{LAMP}}$ is rendered in a low level state and, therefore, the high level signal (See the waveform (b) in FIG. 9) is outputted for a predetermined time from the one-shot monomultivibrator 4e, which signal is transmitted from the terminal TRIG through the AND and OR gates AND6 and OR1 to the gate of the thyristor SCR1 and the base of the transistor Q5 (See the waveform (b) in FIG. 9). Since, however, simultaneously therewith, the high level signal is also inputted from the terminal SHORT to the base of the transistor Q8 through the AND gate AND6 (See the waveform (e) in FIG. 9) to switch the transistor Q8 on, the gate of the thyristor SCR1 is rendered in a low level state and, therefore, as hereinbefore described, the thyristor SCR1 is not switched on, but the transistor Q5 is switched on. Accordingly, when the switch SW7 is switched on, the trigger circuit will not be activated and the flash tube Xe will not fire. When the transistor Q5 is switched on, the insulated gate bipolar transistor IGBT is switched on as is the case during the flash firing, and the capacitor component of the electroluminescent device EL is charged. Also, when the insulated gate bipolar transistor IGBT is switched off, the potential charged on the capacitor component of the electroluminescent device EL is discharged through a resistor R25.

Since a pulse outputted from the EL control circuit 4f is applied to the respective bases of the transistors Q3 and Q4 through the AND and OR gates AND7 and OR2 by way of the terminal STOP, the insulated gate bipolar transistor IGBT is repeatedly switched on and off at the cycle of the pulse generated by the circuit 4f as is the case with the selection of the high speed synchro mode. Therefore, the charging and discharging of the capacitor component of the electroluminescent device EL take place at the cycle of said pulse with the consequence that the electroluminescent device EL emits light.

The one-shot monomultivibrator 42 is brought in inoperative condition when the predetermined time has passed since the switch SW7 was switched on. And then, the AND gates AND6 and AND7 are cut off and, therefore, a low level signal is outputted from the terminals TRIG and STOP of the control circuit 4 with the consequence that the transistors Q3, Q4, Q5 and Q6 and the insulated gate bipolar transistor IGBT are switched off to cause the electroluminescent device EL to interrupt the light emission.

In this way, since the control of the electroluminescent device EL is carried out by means of the insulated gate bipolar transistor IGBT used to control the flash firing of the flash tube Xe, no control means for controlling the electroluminescent device EL is required, permitting the reduction of the number of component parts, that of the manufacturing cost and that of the weight.

As hereinbefore described, in the flash device according to the present invention, since the flash firing can be controlled merely by controlling the voltage to be applied to the gate of the insulated gate bipolar transistor, any possible excessive flash firing which would occur when the increased light emission takes place can be avoided unlike the conventional device in which the thyristor is turned off by the use of the commutating capacitor. Also, no turn-off circuit comprised of the commutating capacitor and others is not required. Moreover, the turn-on and turn-off time of the insulated gate bipolar transistor is so short that the continuously synchronized flash firing at short interval is possible, without any problem being accompanied, merely by synchronizing with the photo-taking operation. Yet, the use of the insulated gate bipolar transistor makes it possible to reduce the size or the structure of the control circuit as is the case with the use of the MOS field effect transistor and, since the size of an insulated gate bipolar transistor is smaller than the field effect transistor, the light-weight feature of the flash device can be accomplished.

And further, in the flash device according to the present invention, since the light emission from the electroluminescent device is controlled by the control means for controlling the firing of the flash unit, no extra control circuit solely for the purpose of controlling the light emission of the electroluminescent device is required. Therefore, the minimization of the number of component parts and the reduction of both the cost and the weight and size can be accomplished.

Also, according to the illustrated embodiment of the present invention, since the insulated gate bipolar transistor is employed as the switching means, the control circuit can be reduced in size as is the case with MOS field effect transistor, and since the size of an insulated gate bipolar transistor is smaller than that of the field effect transistor, the light weight and compact features of the flash device can further be attained.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A flash device comprising:
   a power source;
   a main capacitor adapted to be charged by the power source;
   a flash firing unit operable to consume charge stored in the main capacitor to emit a flash light;
   a trigger means for exciting the flash firing unit in response to a flash firing command;
   an insulated gate bipolar transistor disposed in a discharge loop for the main capacitor through the flash firing unit; and
   a control means for applying a voltage to a gate of the insulated gate bipolar transistor in response to the flash firing command and for interrupting the application of the voltage to the insulated gate bipolar transistor in response to a flash terminating command.

2. The device as claimed in claim 1, wherein said trigger means starts its operation when the insulated gate bipolar transistor is switched on.

3. The device as claimed in claim 1, further comprising a voltage doubler for applying to the flash firing unit a voltage of a value approximately twice the charging voltage of the main capacitor.

4. The device as claimed in claim 1, wherein the flash terminating command disappears subsequent to the disappearance of the flash firing command.

5. The device as claimed in claim 1, wherein said control means includes means for invalidating the flash firing command on the basis of the flash terminating command.

6. The device as claimed in claim 1, wherein said trigger means includes a semiconductor switching means adapted to be switched on in response to the flash firing command, said flash firing unit being excited when said semiconductor switching means is switched on.

7. The device as claimed in claim 1, further comprising a constant voltage generating means for applying a predetermined constant voltage to a gate of the insulated gate bipolar transistor.

8. The device as claimed in claim 7, wherein said predetermined constant voltage is applied from the main capacitor.

9. The device as claimed in claim 1, further comprising:
   an electroluminescent device which is connected with said flash firing unit in parallel;
   means for inputting an emitting signal;
   means for outputting pulses in response to the emitting signal;
   means for inhibiting the operation of said trigger means in response to the emitting signal;
   means for switching on said insulated gate bipolar transistor in response to either of the flash firing command and the pulses outputted by said outputting means.

10. A flash device comprising:
    a power source;
    a main capacitor adapted to be charged by the power source;
    a flash firing unit operable to consume charge stored in the main capacitor to emit a flash light;
    a trigger means for exciting the flash firing unit in response to a flash firing command;
    switching means disposed in a discharge loop for the main capacitor through the flash firing unit;
    an electroluminescent device which is connected with said flash firing unit in parallel;
    means for inputting an emitting signal;
    means for outputting pulses in response to the emitting signal;
    means for controlling said switching means so as to activate said switching means in response to either of the flash firing command and the pulses outputted by said outputting means.

11. The device as claimed in claim 10, wherein said switching means is an insulated gate bipolar transistor.

12. The device as claimed in claim 10, further comprising a liquid crystal display unit, wherein said electroluminescent device is used for back-lighting for said liquid crystal display unit.

* * * * *